(12) United States Patent
Corbitt, III et al.

(10) Patent No.: US 8,572,888 B2
(45) Date of Patent: Nov. 5, 2013

(54) BAIT SAVING HOOK

(75) Inventors: Newsome Corbitt, III, Franklin, NC (US); Newsome Corbitte, Jr., Jacksonville, FL (US)

(73) Assignee: Newsome Corbitt, III, Franklin, NC (US)

( * ) Notice: Subject to any disclaimer, the term of this patent is extended or adjusted under 35 U.S.C. 154(b) by 0 days.

(21) Appl. No.: 13/422,475

(22) Filed: Mar. 16, 2012

(65) Prior Publication Data
US 2013/0239460 A1 Sep. 19, 2013

(51) Int. Cl.
*A01K 83/06* (2006.01)
(52) U.S. Cl.
USPC ............................... 43/44.8; 43/44.2; 43/44.6
(58) Field of Classification Search
USPC ...................... 43/44.2, 44.4, 44.6, 44.8, 43.16
IPC .............................................. A01K 83/00,83/06
See application file for complete search history.

(56) References Cited

U.S. PATENT DOCUMENTS

| 2,538,052 | A | * | 1/1951 | Schwarzer | 43/44.8 |
| 2,982,049 | A | * | 5/1961 | Yost | 43/44.4 |
| 4,713,908 | A | * | 12/1987 | Corbitt, III | 43/43.4 |
| 5,009,026 | A | * | 4/1991 | Corbitt, III | 43/44.8 |
| 5,950,350 | A | * | 9/1999 | Norton | 43/43.6 |
| 2006/0143973 | A1 | * | 7/2006 | Corbitt, III | 43/44.8 |

* cited by examiner

*Primary Examiner* — Darren W Ark
*Assistant Examiner* — Lisa Tsang
(74) *Attorney, Agent, or Firm* — Mark Young, P.A.

(57) ABSTRACT

A fish hook includes a wire strand resilient bait guard. The bait guard includes a pair of hook-shaped attachment portions that engage the eyelet of the fish hook. A collar with ends having interdigitating teeth securely clamps the attachment portion of the bait guard to the shank of the fish hook. The clamped attachment portion includes four parallel segments of wire. This manner of attachment facilitates manufacturing and resists dislodgement.

6 Claims, 5 Drawing Sheets

BAIT SAVING HOOK

FIELD OF THE INVENTION

This invention generally relates to fishing, and more particularly, to a fish hook including a resilient bait guard that is uniquely shaped and attached to a shank in manner that facilitates manufacturing and resists dislodgement.

BACKGROUND

Prior art bait saver hooks, such as the hooks in U.S. Pat. Nos. 4,713,908 and 5,009,026, comprise a conventional fishing hook with an attached resilient wire strand known as a basket. The prior art basket includes free ends that are attached to the shank of the hook near the eyelet by either wrapping the wire ends around the shank or by applying a bead of solder. Between the free ends, the strand includes generally parallel shank portions, a bite portion and a u-shaped tip-engaging portion. Such hooks have proven effective in preventing bait from flying off a hook.

Problems with prior art bait saver hooks relate to aligning and securing the bait saving wire to the hook. In prior art hooks, the free ends of the wire are clamped to the shank of the hook. Often, during manufacturing, the free ends are misaligned, which means the entire wire is misaligned. Additionally, with repeated aggressive use, the free ends tend to dislodge from the attachment that secures the wire to the hook, rendering the wire useless. Wrapped wire tends to loosen over time. Solder is fragile and has a tendency to crack and delaminate. Consequently, the free ends and shank often separate from solder.

Various alternative techniques were evaluated to more securely attach the free ends to the shank. These techniques include bonding, brazing and texturing. Bonding involves the application of glue to the shank and free ends. The process is tedious, increases manufacturing times and cost, and rarely provides a strong durable bond. Brazing involves soldering the free ends to the shank using hard solder with a high melting point. However, that process is even more tedious, significantly increases manufacturing times and cost, and often results in delamination or cracking of the brazed solder. Additionally, it was too difficult to ensure proper alignment during the brazing process, because the molten solder concealed the wire ends and facilitated shifting. Texturing involves deforming, e.g. roughening, the ends of the wire to increase the coefficient of friction between the wire ends. However, this process shows little to no improvement over the prior art, and does not address deficiencies with prior art attachments or proper alignment. All of the evaluated techniques were deemed problematic.

The invention is directed to overcoming one or more of the problems as set forth above.

SUMMARY OF THE INVENTION

To solve one or more of the problems set forth above, in an exemplary implementation of the invention, a bait saving wire strand for a fish hook is provided. The fish hook has an eyelet, a shank extending from the eyelet to a bend, and the bend leading to a sharp tip. The bait saving wire strand includes a pair of hook-shaped attachment portions. Each attachment portion is configured to engage the eyelet of the fish hook and extend along at least a portion of the shank of the hook. Each of a pair of diverging legs extends from one of the pair of hook-shaped attachment portions. Each of a pair of bends extends from one of the pair of diverging legs. A tip engagement portion joins the pair of bends. In a preferred embodiment, the tip engagement portion includes a u-shaped tip. The bait saving wire is flexible. The tip engagement portion of the bait saving wire strand is positionable by urging the tip engagement portion against the tip of the hook between the tip of the hook and the shank of the hook, and the tip engagement portion is releasable to a position adjacent the tip but not between the tip of the hook and the shank of the hook.

The pair of hook-shaped attachment portions includes a pair of free ends, a pair of eyelet bends, and a pair of shank portions. Each of the pair of free ends extends to one of the pair of eyelet bends. Each of the pair of shank portions extends to one of the pair of eyelet bend. Each of the pair of eyelet bends joins one of the pair of free ends to one of the pair of shank portions. Each of the pair of eyelet bends provides approximately a 180° bend and engages a portion of the eyelet. Each eyelet bend has a radius of curvature that is not less than, a preferably equal to or only slightly larger than, a radius of the portion of the eyelet engaged by the eyelet bend. Each of the pair of shank portions is substantially parallel to the shank of the hook. Each of the pair of free ends is substantially parallel to the shank of the hook. Each of the pair of shank portions extend to one of the pair of diverging legs. The pair of shank portions joins the pair of diverging legs to the pair of eyelet bends.

An exemplary bait saving hook assembly according to principles of the invention is also provided. The fish hook includes an eyelet, a shank extending from the eyelet to a bend, which leads to a sharp tip. The bait saving wire strand includes a pair of hook-shaped attachment portions. Each attachment portion engages the eyelet of the fish hook and extends along at least a portion of the shank of the hook. Each attachment portion includes two segments parallel to the shank of the hook. Each of a pair of diverging legs extends from one of the pair of hook-shaped attachment portions. Each of the pair of bends extends from one of the pair of diverging legs. A u-shaped tip engagement portion joins the pair of bends.

The bait saving wire is flexible. The tip engagement portion of the bait saving wire strand is positionable by urging the tip engagement portion against the tip of the hook between the tip of the hook and the shank of the hook. The tip engagement portion is releasable to a position adjacent the tip but not between the tip of the hook and the shank of the hook.

The pair of hook-shaped attachment portions includes a pair of free ends, a pair of eyelet bends, and a pair of shank portions. Each of the pair of free ends extends to one of the pair of eyelet bends. Each of the pair of shank portions extends to one of the pair of eyelet bend. Each of the pair of eyelet bends joins one of the pair of free ends to one of the pair of shank portions. Each of the pair of eyelet bends provides approximately a 180° bend and engages a portion of the eyelet. Each eyelet bend has a radius of curvature that is not less than, a preferably equal to or only slightly larger than, a radius of the portion of the eyelet engaged by the eyelet bend. Each of the pair of shank portions is substantially parallel to the shank of the hook. Each of the pair of free ends is substantially parallel to the shank of the hook. Each of the pair of shank portions extend to one of the pair of diverging legs. The pair of shank portions joins the pair of diverging legs to the pair of eyelet bends.

A collar clamps, to the shank of the fish hook, the segments of the pair of hook-shaped attachment portions that are parallel to the shank of the fish hook. The collar includes a band rolled into a sleeve having an inner diameter sized to securely clamp the segments of the pair of hook-shaped attachment portions that are parallel to the shank of the fish hook against the shank of the fish hook. The band includes a first free end and a second free end. The first free end abuts the second free end without overlap between the first free end and the second free end. The first free end and the second free end include interdigitating teeth. Thus, for example, the first free may have a first tooth portion and a first recess portion and the second free end may have a second tooth portion and a second recess portion, wherein the first tooth portion engages the second recess portion, and the second tooth portion engages the first recess portion.

Faced with the persistent problem and dissatisfaction with the aforementioned attachments, the inventor conceived an innovative bait saving wire strand, i.e., basket, and corresponding attachment collar. The innovative wire strand requires different tooling from that used to produce the prior art wire strand. However, the innovative wire does not add any additional steps to the manufacturing process. No additional materials are required. The only added cost involved the non-recurring up-front cost to modify tooling configured to produce the prior art wire strands. If the tooling was created from scratch, the innovative wire would incur no appreciable additional cost at all. Once the tooling was created, the innovative wire did not appreciably increase the time required to produce the wire. Advantageously, the redesigned wire solves the persistent problem by assuring proper alignment and securement, during manufacturing, each and every time, and even after repeated and aggressive use.

The innovative attachment collar positively secures four segments of the wire strand to the shank of the hook in a manner that ensures proper alignment. The attachment collar is uniquely configured to resist misalignment and ineffective clamping. While the attachment collar is an added part, it replaces windings and solder in the prior art, that were tedious, time consuming, and only marginally effective for securing the wire strand to the shank.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the particular components, shapes, configurations, relative sizes, ornamental aspects or proportions shown in the figures.

DETAILED DESCRIPTION

Figure 1:
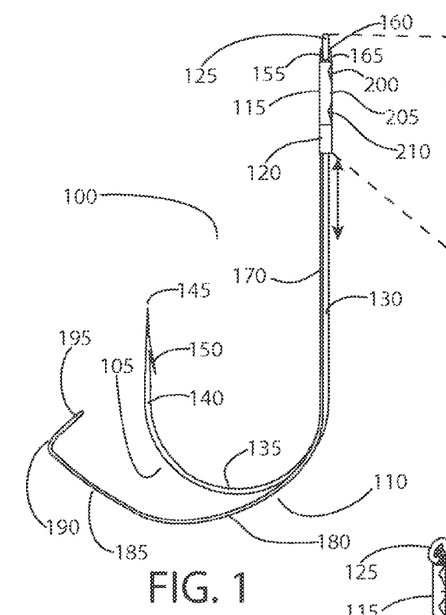
FIG. 1 is a profile view of an exemplary improved bait saving hook according to principles of the invention.

Referring to FIG. 1, a profile view of an exemplary improved bait saving hook 100 according to principles of the invention is provided. The bait saving hook 100 is an assembly comprising a fishing hook 105 and a bait saving basket 110 attached to the shank 130 of the fishing hook. The hook 105 is a generally J-shaped structure constructed of an elongated wire, typically comprised of high-carbon steel, steel alloyed with Vanadium, or stainless steel, depending on application. The hook may be covered with some form of corrosion-resistant surface coating. An eyelet 125 is provided at one end of the hook 105 for attaching a fishing line (not shown) thereto. The opposite end of the hook 105 is provided with a sharpened tip 145 having a protruding barb 150 projecting backwards from the tip 145. As is well known, the barb 150 secures a fish from unhooking. A shank portion 130 extends from the eyelet 125 to a bend or bight portion 135. The bend curves through approximately 180 degrees, although it could be more or less depending upon the particular hook. The radius of curvature of the bend may vary considerably, but is typically about ½ to ¼ of the combined lengths of the eyelet 125 (i.e., the outer diameter of the eyelet) and shank portion 130 of the hook 105. A neck 140 extends from the bend 135 to the tip 145. The barb 150 projects from the tip 145 and the neck 140.

The hook 105 depicted in the Figures represents a fishing hook. The invention is not limited to a particular type or size hook. Other hooks, with additional and different bends; straight, offset, bent, barbed and barbless shanks; upturned, downturned or straight eyelets; and other structural features may be utilized without departing from the scope of the invention. As one example, the invention is not limited to use with barbed hooks. Barbless hooks may be used within the spirit and scope of the invention. As another example, the principles of the invention may be readily applied to double and treble hooks, which are also intended to come within the scope of the invention.

As shown in FIGS. 1-7, a bait saving wire basket 110 (i.e., bait saving basket) is attached to the hook 105. In its simplest form, the basket 110 may comprise a flexible wire frame with segments that are spread apart and generally track the profile of the hook 105. The segments are joined by a generally u-shaped portion configured to pass over the tip 145 of the hook 105 and engage the barb 150. The exemplary bait saving basket 110, as illustrated in FIGS. 1, 3, 4, 11 and 13 is comprised of a flexible wire strand bent to form generally parallel free ends 165, 167, generally parallel eyelet bends 162, 180, generally parallel shank portions 166, 168, a pair of diverging legs 170, 175, a pair of generally parallel bends 180, 182, a pair of arms 185, 187, a pair of bent shoulders 190, 192 and a u-shaped tip 195. The divergent legs 170, 175 provide some distance between the hook 105 and the bends 180, 182 of the basket 110. Optionally, shoulders 190, 192 join the u-shaped tip 195 to the arms 185, 187. Alternatively, the u-shaped tip 195 may be joined directly to the bends 180, 182. The portion with the u-shaped tip 195 is referred to as the engagement portion because it engages the hook 105 when retaining bait. The basket 110 is flexible so that the u-shaped tip 195 may be deflected over the tip 145 of the hook 105, tucked against the tip or beneath the barb 150. The free ends 165, 167 and shank portions 166, 168 of the wire strand are clamped to the shank 130 of the hook 105 using a clamp 115, which is discussed more fully below. Thus, four segments of the bait saving basket 110 are clamped to the shank 130 of the hook 105. Each of the generally parallel eyelet bends 162, 180 comprises a 180° bend between the free ends 165, 167 and shank portions 166, 168 of the wire strand. The eyelet bends 162, 160 allow the free ends 165, 167 to pass through the eyelet 125 and extend along a portion of the shank 130 of the hook 105, parallel to but opposite the side along which the shank portions 166, 168 of the basket 110 extend. The portion of the basket 110 comprising the free ends 165, 167 and shank portions 166, 168 joined by the eyelet bends 162, 160 is referred to as the attachment portion of the basket 110 because it is the portion that attaches to the hook 105.

Figure 15:
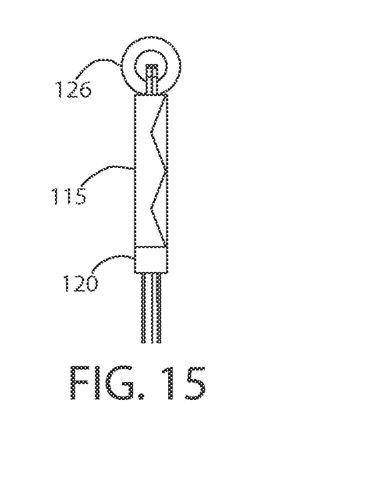
FIG. 15 is a magnified side view of an attachment collar portion of the alternative exemplary improved bait saving hook according to principles of the invention.
Figure 16:
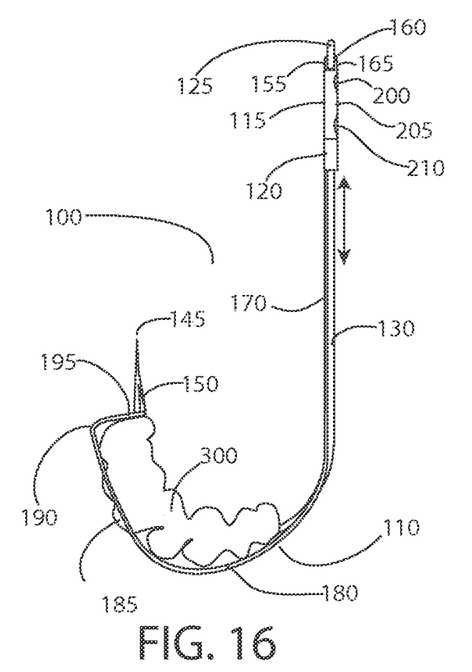
FIG. 16 is a profile view of an exemplary improved bait saving hook according to principles of the invention with bait retained thereon.

With reference to FIG. 15, in use, bait 300 slid on the neck 140 and bend 135 of the hook 105 is retained and/or constrained by the u-shaped tip 195 as well as bends 180, 182, and arms 185, 187 and shoulders 190, 192 of the basket 110, when the u-shaped tip 195 is engaged by the barb 150 or the neck 140 of the hook 105. In many hooks the neck is an integral part of the bend that leads to the tip. The bait 300 will not dislodge and fly off the tip 145 of the hook 105 when retained by the basket 110, even during casting. While the basket 110 retains the bait 300, the basket 110 does not block the tip 145 or barb 150 of the hook and is sufficiently flexible to yield under the influence of a fish bite. Thus, when a fish bites the bait 300, the basket 110 will not prevent the tip 145 and barb 150 from penetrating the tissue of the fish.

Figure 2:
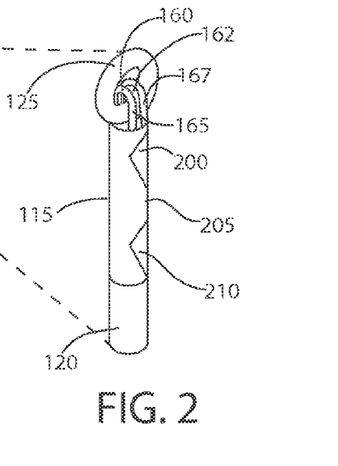
FIG. 2 is a magnified view of an attachment portion of an exemplary improved bait saving hook according to principles of the invention.
Figures 3, 4:
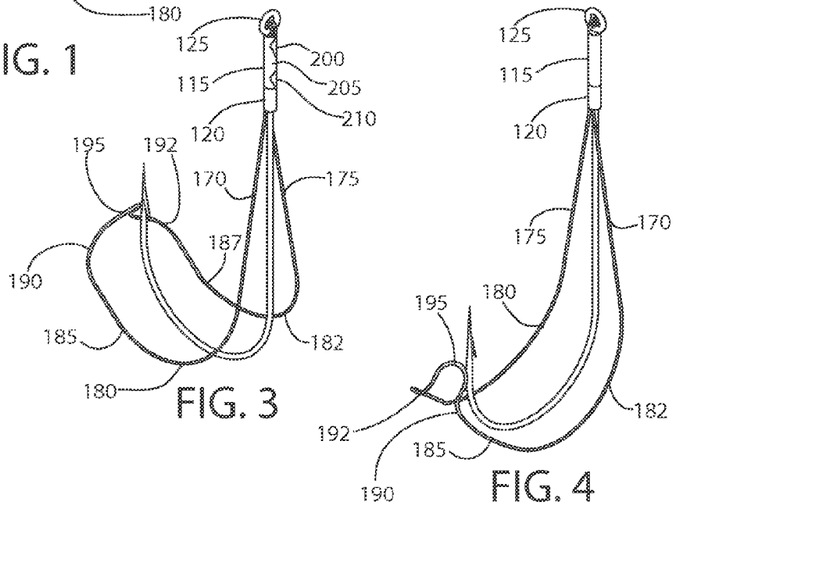
FIG. 3 is a first perspective view of an exemplary improved bait saving hook according to principles of the invention.
FIG. 4 is a second perspective view of an exemplary improved bait saving hook according to principles of the invention.

FIG. 2 provides a magnified view of an attachment portion of an exemplary improved bait saving hook 100 according to principles of the invention. The attachment portion includes a collar 115 and a movable slider 120. The movable slider 120 is a sleeve that surrounds the shank 130 of the hook 105 and the diverging legs 170, 175 of the basket 110. The slider 120 may be slid from the bottom end of the collar 115 towards the bend 135 of the hook 105. As the slider 120 is moved away from the collar 115, the slider constrains a portion of the diverging legs 170, 175, causing the constrained portion of the legs 170, 175 to bend parallel to each other and the shank 130. The effect is a reduction in distance between the opposite bends 180, 182 and arms 185, 187 of the basket 110. Reducing the gap helps constrain and retain narrow bait.

Figure 5:
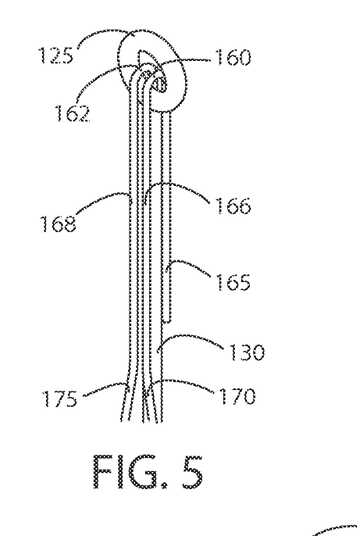
FIG. 5 is a first magnified perspective view of an eyelet portion of an exemplary improved bait saving hook according to principles of the invention.
Figure 6:
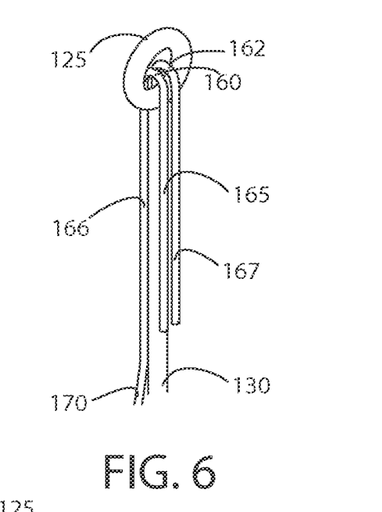
FIG. 6 is a second magnified perspective view of an eyelet portion of an exemplary improved bait saving hook according to principles of the invention.
Figure 7:
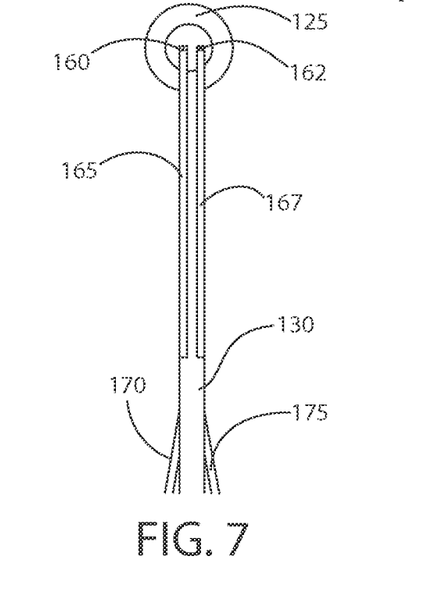
FIG. 7 is a rear magnified view of a portion of an exemplary improved bait saving hook according to principles of the invention.
Figure 8:
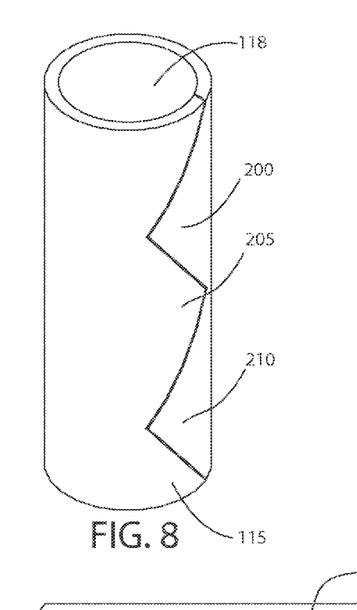
FIG. 8 is a perspective view of an exemplary collar for an improved bait saving hook according to principles of the invention.
Figure 9:
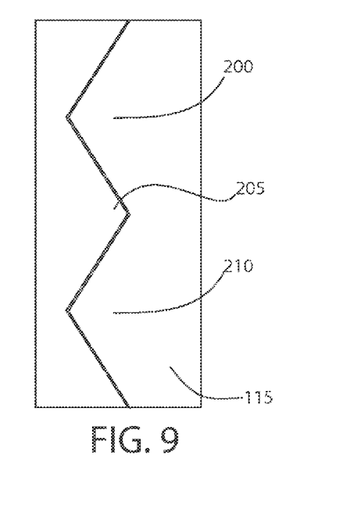
FIG. 9 is a front view of an exemplary collar for an improved bait saving hook according to principles of the invention.
Figure 10:
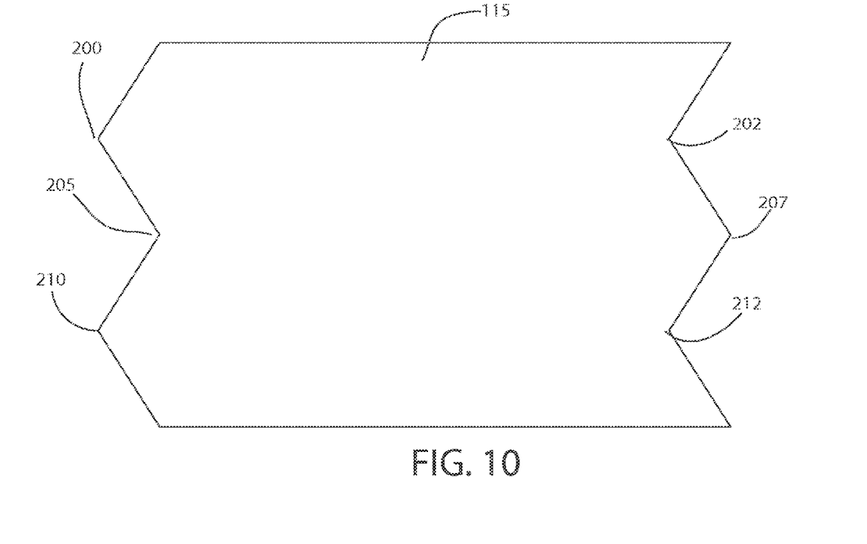
FIG. 10 is a plan view of a band for forming an exemplary collar for an improved bait saving hook according to principles of the invention.
Figure 11:
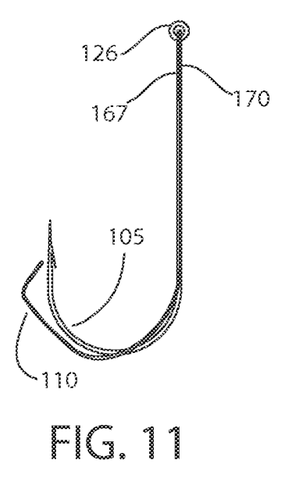
FIG. 11 is a side view of an alternative exemplary improved bait saving hook according to principles of the invention.
Figure 12:
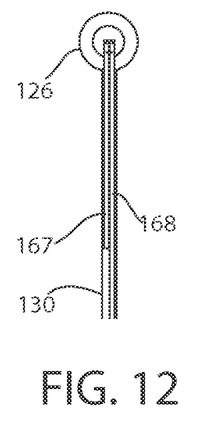
FIG. 12 is a magnified side view of an attachment portion of the alternative exemplary improved bait saving hook according to principles of the invention.
Figure 13:
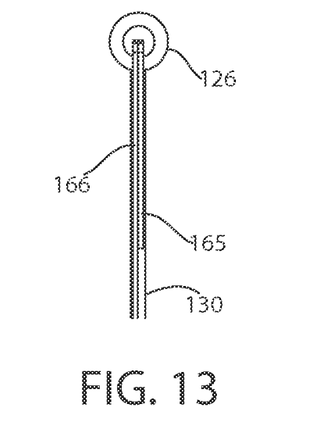
FIG. 13 is a magnified side view of the attachment portion opposite that shown in FIG. 12 for the alternative exemplary improved bait saving hook according to principles of the invention.
Figure 14:
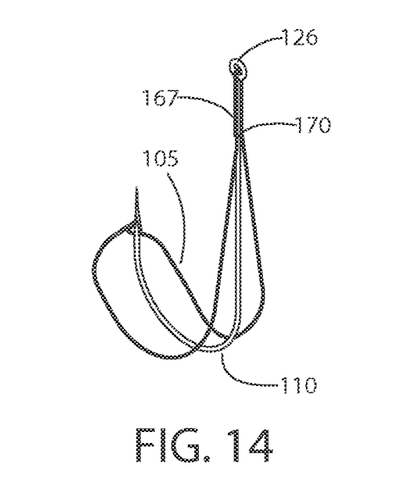
FIG. 14 is a perspective view of the alternative exemplary improved bait saving hook according to principles of the invention.

As shown in FIG. 2, as well as in FIGS. 8-10, the collar 115 is a metallic band that has been bent (i.e., rolled) into a sleeve-like structure that securely clamps four segments of the basket 110 to the shank 130. The collar is sized to fit tightly around the shank and the four engaged segments of wire abutting the shank. Interdigitating teeth of the collar substantially enhance structural integrity by distributing longitudinal loads across the free ends. The collar is compressed into a generally sleeve-like clamp that surrounds and securely grips the shank of the hook as well as four strands of wire, instead of two strands of wire as with the prior art. The four constrained segments 165, 166, 167, 168 are best illustrated in FIGS. 5-7, which show the top portion of the bait saving hook assembly 100, without the collar 115 and without the slider 120. As shown in FIGS. 5-7, each free end 165, 167 of the basket 110 is joined to a parallel shank portion 166, 168 of the wire strand by an eyelet bend 160, 162. The collar is sized to cover each free end 165, 167 of the basket 110. The eyelet bend 160, 162 is a 180° bend with a radius of curvature that is approximately equal to or slightly larger than the diameter of the portion of toroid-shaped eyelet over which each bend 160, 162 extends. The collar 115 is compressed to securely grip each free end 165, 167 of the basket 110 is joined to a parallel shank portion 166, 168 of the wire strand by an eyelet bend 160, 162. Thus, to dislodge the engaged segments enough tensile force would have to be exerted to the opposite end of the basket to release the shank portion 166, 168 of the wire strand, undo the eyelet bend 160, 162, and release each free end 165, 167 of the basket 110. Such tensile forces are not encountered in normal use.

One free end of the band includes at least one tooth-like structure 200, 210. The other free end of the band includes at least one recess 202, 212 configured to receive the tooth-like structure. As shown in FIG. 10, an exemplary band includes one end having a pair of teeth-like structures 200, 210 separated by a recess 205, while the opposite free end includes a pair of complementary recesses 202 separated by a complementary tooth-like structure 207. The number of teeth-like structures and corresponding recesses may vary, without departing from the spirit and scope of the invention. The free ends of the band meet and interdigitate, without overlapping. Interdigitating teeth of the shank substantially enhance structural integrity by distributing longitudinal loads across the free ends. Interdigitation also ensures that the ends of the band align properly when the sleeve-like structure is formed. Without interdigitating ends, there is a risk of skewed clamping with the top end of the clamp looser than the bottom end of the clamp, or vice versa. In either case, a skewed clamp may provide inadequate gripping pressure. Here, the teeth and corresponding recesses ensure proper alignment, which ensures consistent pressure distribution and gripping of engaged segments and the shank.

Overlapping ends are susceptible to loosening by prying apart. To allow the free ends of the band to meet without overlap, the band 115 is carefully cut to size based upon the diameter of the contained portion of the shank 130 of the hook 105 and the four contained segments 165, 166, 167, 168 of the basket 110.

Performance of the wire according to principles of the invention exceeded all expectations. Even after repeated use in testing, and repeated pulling of the wire basket, no dislodgement or misalignment occurred. Suspending the hook 100 from a fixed point and hanging a brick from the basket 110 for several hours revealed no dislodgement. Submersion in ice water, boiling water, ice and then boiling water and vice versa, followed by tensile testing revealed no compromise in clamping integrity. Submersion in lubricating oil and silicone spray followed by tensile testing revealed no compromise. With the new wire, which has generally parallel free ends 165, 167 joined to parallel shank portions 166, 168 by an eyelet bend 160, 162, according to principles of the invention, the basket does not become dislodged during normal use.

Referring now to FIGS. 11-15, an alternative exemplary improved bait saving hook according to principles of the invention is shown. The difference between this embodiment and the embodiment described above is the orientation of the eyelet 126 and the resulting effect on the corresponding bends of the wire basket 110. Here, the eyelet 126 is rotated 90° relative to eyelet 125 described above. The eyelet 126 in FIGS. 11-15 resides in the central plane of the hook 105. Thus, the eyelet 126 creates an overall thinner hook.

In the embodiment of FIGS. 11-15, one free end 167 of the basket is bent and extends through one side of the eyelet 126, while the other free end 165 is bent and extends through the other side of the eyelet. Regardless, the collar 115 still clamps the shank 130 of the hook 105 along with four segments of the wire basket, namely, the free ends 165, 167, which are now on opposite sides of the shank 130, and the shank portions 166, 168 of the wire strand basket 110.

The basket may be comprised of metallic, plastic or composite material. In a preferred embodiment, a metal wire strand is bent to form the basket. Wire bending equipment, including, but not limited to, manual jigs and dies and automated wire bending machines now known and hereafter developed may be used to form the basket. In the case of metal wire, any thickness that provides sufficient flexibility and tensile strength may be used. By way of example and not limitation, 20 to 40 gauge AWG wire may be utilized. The composition of the wire may include stainless steel, galvanized steel or titanium, or alloys thereof, or any other corrosion resistant metal that is readily available, affordable and suitable for mass production.

In an alternative embodiment, the basket 110 may be formed of a metal alloy that exhibits pseudo-elasticity. Pseudo-elasticity may be achieved by proper alloy formulation and heat treatment. Such materials used for a basket according to the principles of this invention include shape memory alloys which exhibit super-elastic/pseudo-elastic shape recovery characteristics. Such alloys are known in the art, but heretofore have not been tailored for or applied to bait guards. These alloys are characterized by their ability to be transformed from an austenitic crystal structure to a stress-induced martensitic (SIM) structure at certain temperatures, and return elastically to an austenitic structure when the stress is removed. These alternating crystalline structures provide the alloy with its super-elastic properties. One such well-known alloy, nitinol, is a nickel-titanium alloy. It is readily commercially available and undergoes the austenite-SIM-austenite transformation at a variety of temperature ranges between −20° C. and 30° C. These alloys are especially suitable because of their capacity to elastically recover almost completely to the initial configuration once a stress is removed. Typically there is little plastic deformation, even at relatively high strains. This allows the basket to undertake substantial bends as a hook is baited and a fish bites, and yet return to its original shape once the stress has been removed without retaining any hint of a kink or a bend. Additionally, compared to stainless steel, less force need be exerted to deform the basket thereby decreasing detection by a fish and resistance to setting the hook.

The wire basket 110 may also be plastic. For example, the wire may be formed from injection molded plastic. The resin may be a polycarbonate, however other resins which may also be used, alone or in combination, include: Acrylonitrile Butadiene Styrene (ABS), Acrylic, Polymethyl Methacrylate (PMMA), Acrylic+Polycarbonate (Acrylic+PC), Tenite Acetate (CA), Tenite Butyrate (CAB), Tenite Propionate (CAP), Ethylene Tetrafluoroethylene (ETFE), Engineering Thermoplastic Polyurethane (ETPU), Ethylene Vinyl Alcohol Copolymer (EVOH), Methylmethacrylate Butadiene Styrene (MBS) Polyamide (Nylon), Polyamide 12 (Nylon 12), Polyamide 6 (Nylon 6), Polycarbonate+Polyethylene Terephthalate (PC+PET), Polycarbonate+Polyester, PCTA, PCTG, Polyarylate, Polyester Alloy, Polyester TP, Polyolefin, Polyphthlate Carbonate (PPC), Polystyrene (PS, GPPS), Polysulfone (PSU), Flexible Polyvinyl Chloride (Flexible PVC), Rigid Polyvinyl Chloride (Rigid PVC), Polyvinylidene Fluoride (PVDF), Styrene Acrylonitrile (SAN), Styrene Butadiene Block Copolymer (SB), Thermoplastic Elastomer (TPE), Thermoplastic Polyurethane Elastomer Polyether (TPU-Polyether), or other unspecified thermoplastics suitable for construction of a resilient, flexible wire basket 110.

Advantageously, the plastic forming the basket 110 may be transparent or colored so as to be substantially invisible in a body of water or otherwise colored to resemble the body of a bait fish or to at least catch the attention of a fish. This allows a fish to see the bait, but not be deterred by the basket 110. In the molding process, it is noted that polycarbonate typically has a yellowish tint. A blue colorant may be added such that the resulting molded plastic is generally clear. The plastic may further include additives such as phosphorescent compounds to provide other desired properties such as glow-in-the dark properties, or and thermal reactivity (e.g., color changes according to heat).

The resilient plastic basket 110 readily flexes during hook set, minimizing interference and delay with hook penetration. The hook 105 will thus set quickly and solidly and fewer fish will detect the basket and escape without being hooked. After external forces are removed, the basket will spring back to its original shape, ready for use again without having to reform the basket.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

The invention claimed is:

1. A fish hook with a bait saving wire strand, said fish hook having an eyelet, a shank, a bend and a sharp tip, said shank extending from the eyelet to the bend, and said bend leading to the sharp tip, and said eyelet having a first side and an opposite second side with an opening therebetween, and said bait saving wire strand comprising a single strand of wire including:

a pair of hook-shaped attachment portions, each attachment portion being configured to engage the eyelet of the fish hook and extend along at least a portion of the shank of the hook;

a pair of diverging legs, each diverging leg extending from one of the pair of hook-shaped attachment portions;

a pair of bends, each bend extending from one of the pair of diverging legs;

a tip engagement portion joining the pair of bends; and said bait saving wire being flexible, and said tip engagement portion of said bait saving wire strand being positionable by urging the tip engagement portion against the tip of the hook between the tip of the hook and the shank of the hook, and said tip engagement portion being releasable to a position adjacent the tip but not between the tip of the hook and the shank of the hook, and said pair of hook-shaped attachment portions comprising a pair of free ends, a pair of eyelet bends, and a pair of shank portions, each of the pair of free ends extending to one of the pair of eyelet bends at the first side of the eyelet of the hook, each of the pair of shank portions extending to one of the pair of eyelet bends at the second side of the eyelet of the hook, each of the pair of eyelet bends joining one of the pair of free ends to one of the pair of shank portions, and each of the pair of eyelet bends providing approximately a 180° bend, each of the pair of eyelet bends passing through the eyelet of the hook and engaging a portion of the eyelet of the hook, and each of the pair of shank portions being substantially parallel to the shank of the hook, and each of the pair of free ends being substantially parallel to the shank of the hook and to the pair of shank portions, and each of the pair of shank portions extending to one of the pair of diverging legs, said pair of shank portions joining the pair of diverging legs to the pair of eyelet bends, and a collar clamping four segments of the wire strand to the shank of the fish hook, the four segments including a first segment of each of the pair of shank portions of the wire strand, and a second segment of each of the pair of free ends of the wire strand, said collar being adjacent to the eyelet.

2. The fish hook with a bait saving wire strand according to claim 1, each eyelet bend having a radius of curvature that is not less than a radius of curvature of the portion of the eyelet that is engaged by the eyelet bend.

3. The fish hook with a bait saving wire strand according to claim 2, each eyelet bend having a radius of curvature that is approximately equal to a radius of curvature of the portion of the eyelet engaged by the eyelet bend.

4. The fish hook with a bait saving wire strand according to claim 1, said tip engagement portion comprising
a u-shaped tip.

5. The fish hook with a bait saving wire strand according to claim 1, said tip engagement portion comprising
a pair of arms, each arm of the pair of arms extending from one of the pair of bends; and
a pair of shoulders, each shoulder of the pair of shoulders comprising a bight section extending from one of the pair of arms; and
a u-shaped tip disposed between and joining the pair of shoulders.

6. The fish hook with a bait saving wire strand according to claim 1, said collar comprising a band rolled into a sleeve, said sleeve having an inner diameter sized to securely clamp the segments of the pair of hook-shaped attachment portions that are parallel to the shank of the fish hook against the shank of the fish hook, said band including a first end and a second end, said first end abutting the second end without overlap between the first end and the second end when the band is rolled into the sleeve, and said first end and said second end including interdigitating triangular teeth.

\* \* \* \* \*